United States Patent

Ma

[11] Patent Number: 5,518,092
[45] Date of Patent: May 21, 1996

[54] PHASE CHANGE MECHANISM

[75] Inventor: Thomas T. Ma, Essex, United Kingdom

[73] Assignee: Ford Motor Company, Dearborn, Mich.

[21] Appl. No.: 343,558

[22] PCT Filed: Jun. 21, 1993

[86] PCT No.: PCT/GB93/01307
§ 371 Date: Nov. 28, 1994
§ 102(e) Date: Nov. 28, 1994

[87] PCT Pub. No.: WO94/00676
PCT Pub. Date: Jan. 6, 1994

[30] Foreign Application Priority Data

Jun. 20, 1992 [GB] United Kingdom ............... 9213210

[51] Int. Cl.⁶ .................................................. F01L 1/34
[52] U.S. Cl. ............................. 192/41 R; 123/90.15; 123/90.17; 464/2
[58] Field of Search ............... 192/41 R; 123/90.11, 123/90.15, 90.17, 90.31; 464/2, 29, 160

[56] References Cited

U.S. PATENT DOCUMENTS

| | | | |
|---|---|---|---|
| 4,231,330 | 11/1980 | Garlea | 123/90.15 |
| 4,494,496 | 1/1985 | Nakamura et al. | 123/90.15 |
| 4,545,338 | 10/1985 | Allred, III | 123/90.15 |
| 4,754,727 | 7/1988 | Hampton | 123/90.15 |
| 4,787,345 | 11/1988 | Thoma | 123/90.17 |
| 4,825,992 | 5/1989 | Skrobisch | 192/56 |
| 4,967,701 | 11/1990 | Isogai et al. | 123/90.11 |
| 5,040,651 | 8/1991 | Hampton et al. | 192/45.1 |
| 5,133,310 | 7/1992 | Hitomi et al. | 123/90.17 |
| 5,172,660 | 12/1992 | Hampton | 464/2 X |
| 5,174,169 | 12/1992 | Allen | 123/90.15 X |
| 5,234,088 | 8/1993 | Hampton | 123/90.15 X |
| 5,329,890 | 7/1994 | Mueller | 192/90.17 |
| 5,381,764 | 1/1995 | Fukuma et al. | 123/90.17 |
| 5,386,807 | 2/1995 | Linder | 123/90.17 |

FOREIGN PATENT DOCUMENTS

92/03637 3/1992 WIPO.

*Primary Examiner*—Andrea L. Pitts
*Attorney, Agent, or Firm*—Jerome R. Drouillard; Roger L. May

[57] ABSTRACT

A phase change mechanism is described for varying the phase of an engine camshaft relative the engine crankshaft. The mechanism comprises a drive member to be connected to the camshaft drive, a driven member to be connected to the camshaft, a coupling element for transmitting torque from the drive member to the driven member and movable relative to the drive and driven members to vary the phase between the drive and driven members, an inertial member coupled by means of a one-way clutch for rotation with the drive and driven members and having an eccentric crank thereon acting on the coupling element to vary the position of the coupling element in dependence of the angular position of the inertial member, and latching means for arresting rotation of the inertial member at predetermined angular positions, characterised in that the latching means comprise an abutment surface projecting radially from the inertial member, a latch member mounted on one of the drive and driven members for transverse sliding movement relative to the axis of the inertial member between two end positions, a pair of opposed abutment surfaces on the latch member disposed one on each side of the inertial member and each engaging the abutment surface on the inertial member in a respective one of the end positions of the latch member and means for switching the latch member between the end positions while the phase change mechanism is rotating.

3 Claims, 1 Drawing Sheet

PHASE CHANGE MECHANISM

TECHNICAL FIELD

The invention relates to a phase change mechanism for varying the phase of a driven member relative to a drive member. The mechanism of the invention can be used for varying the phase of the camshaft relative to the crankshaft in a single camshaft engine or for varying the relative phase of the inlet valve camshaft and the exhaust valve camshaft in an engine with dual camshafts.

BACKGROUND OF THE INVENTION

The optimum times for opening and closing the inlet and exhaust valves in an internal combustion engine vary with operating parameters such as engine load and speed. In any engine with fixed angles for opening and closing the valves for all engine operating conditions, the valve timing is a compromise which detracts from the engine efficiency in all but a limited range of operating conditions. For this reason, control systems have been proposed which vary the valve timing during engine operation.

Numerous phase change mechanisms are described in the prior art using a wide variety of techniques and principles. The mechanism which bears the closest resemblance to that of the present invention is that described in the Applicants' own earlier PCT Patent Publication No. WO90/10788.

The latter publication discloses a phase change mechanism for a camshaft of an internal combustion engine, which comprises a drive member to be connected by a toothed belt to the crankshaft, a driven member to be connected to the camshaft and a coupling element for transmitting torque from the drive member to the driven member. The coupling element is connected for rotation with the drive and driven members in such a manner that the phase of the driven member relative to the drive member is dependent upon the position of the coupling element. An inertial member is connected to the coupling element by an eccentric crank which causes the coupling element to move between two end positions when the inertial member rotates relative to the drive and driven members, and means are provided for applying a torque to the inertial member in order to vary the speed of rotation of the inertial member relative to the drive and driven members.

The preferred means for applying a torque to the inertial member in this earlier proposal comprised a one-way clutch acting between the inertial member and one or other of the drive and driven members. Because of torque fluctuations acting on the camshaft, the inertial member will naturally tend to oscillate relative to the camshaft but, when a one-way clutch is interposed between them, relative motion can only occur in one direction and the inertial member will always tend to rotate in one direction relative to the camshaft. The torque will vary with the position of the eccentric crank, being at a minimum in the dead centre positions when the crank offset lies in line with the reaction force and at a maximum when it is at right angles to the reaction force. Though in theory no torque should be acting on the crank in the dead centre positions in practice inertial and frictional effects create enough torque to displace the inertial member from the dead centre positions and the latter will keep on rotating unless it is arrested by latches of some sort. Whenever a phase change is required a latch is released and without any external torque being applied, the inertial member will rotate to its next latched position.

OBJECT OF THE INVENTION

The present invention seeks to provide a phase change mechanism which employs an inertial member coupled to the drive or driven member by a one-way clutch and having a latching means for preventing rotation of the inertial member in predetermined positions, in which the latching means are of simple construction and can readily be actuated externally while the phase change mechanism is rotating.

SUMMARY OF THE INVENTION

According to the present invention, there is provided a phase change mechanism for varying the phase of an engine camshaft relative the engine crankshaft, comprising a drive member to be connected to the camshaft drive, a driven member to be connected to the camshaft, a coupling element for transmitting torque from the drive member to the driven member and movable relative to the drive and driven members to vary the phase between the drive and driven members, an inertial member coupled by means of a one-way clutch for rotation with the drive and driven members and having an eccentric crank thereon acting on the coupling element to vary the position of the coupling element in dependence of the angular position of the inertial member, and latching means for arresting rotation of the inertial member at predetermined angular positions, characterised in that the latching means comprise an abutment surface projecting radially from the inertial member, a latch member mounted on one of the drive and driven members for transverse sliding movement relative to the axis of the inertial member between two end positions, a pair of opposed abutment surfaces on the latch member disposed one on each side of the inertial member and each engaging the abutment surface on the inertial member in a respective one of the end positions of the latch member and means for switching the latch member between the end positions while the phase change mechanism is rotating.

Preferably, the latch member comprises a pair of permanent magnets at its opposite ends, which rotate relative to a stationary electromagnet having a magnetic field with radially extending lines of force.

The permanent magnets on the latch member preferably project out of the plane passing through the abutment surface and the armature of the electromagnet may conveniently be disposed radially inwards of the locus of the two magnets.

If two magnets are arranged on the latch member at its opposite ends, one with it north pole pointing towards the rotational axis and the other with its south pole facing the axis then by reversing the magnetic field produced by the stationary annular electromagnet the latch member can be switched between its end positions without any mechanical contact taking place with the latch member, which may be rotating at high speed.

Advantageously, the latch member is a continuous ring surrounding the inertial member, the centre of gravity of the latch member lying on opposite sides of the axis of rotation of the phase change mechanism in the end positions of the latch member, whereby the latch member is retained in each of its end positions by centrifugal force. The electromagnet needs only therefore to be actuated during phase changes and not at other times, thereby reducing the power consumption of the phase change mechanism.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
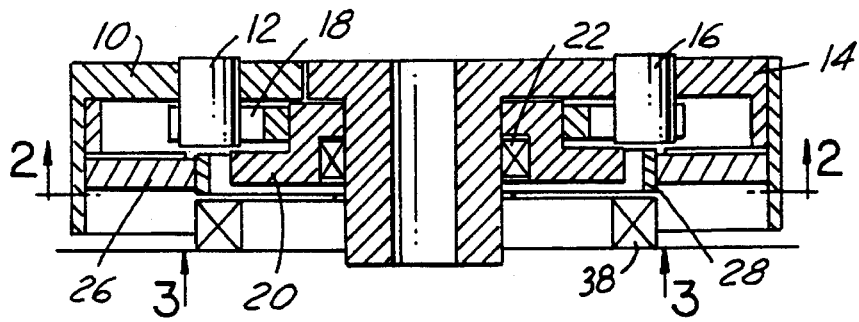
FIG. 1 is an axial section through a phase change mechanism of the invention.

The phase change mechanism in the drawings is formed as a drive pulley for the camshaft of an engine. The pulley has an outer toothed drive member 10 which is engaged by a toothed belt passing around the crankshaft pulley. The drive member 10 is journalled for rotation about a driven member 14 which has a central hub for connection to the engine camshaft. The drive member 10 has a radial extension on which is mounted a pin 12 and a second pin 16 is mounted on the driven member 14. Torque is transmitted from the drive member 10 to the driven member 14 through the pins 12 and 16 which engage a coupling member 18 in the form of a yoke with two diametrically opposed slots in which the pins engage. The coupling member 18, as will be described below, can move relative to the drive member 10 and the driven member 14 and such movement result in a change in the phase between these two members. The coupling member 18 is shown as making only line contact with the pins 12 and 16 but the pins 12 and 16 can if desired be fitted with sliders or shoes so that wear can be reduced.

The coupling member 18 has a central circular aperture which is journalled about an eccentric crank 20' which projects axially from an inertial member 20 which is mounted on the hub of the driven member 14 through a one-way or overrunning clutch 22. In this way the inertial member can rotate freely about the hub but in only one direction.

Because of the inertia of the inertial member 20, it cannot follow the torsional vibrations of the camshaft which are caused by the torque fluctuations on the camshaft. In the absence of the one-way clutch 22 these torque fluctuations would cause the inertial member 20 to oscillate relative to the hub of the driven member 14 but because the one-way clutch 22 prevents movement in one direction, the net effect of the torque fluctuations is to make the inertial member 20 rotate always in the other direction about the hub.

As the inertial member 20 rotates, its crank 20' moves from one side of the axis of the driven member 14 to the other and causes a similar movement of the coupling member 18, which therefore moves to advance then retard the phase of the driven member 14 relative to the drive member 10 with each complete revolution of the inertial member 20. All that is required to achieve a phase changing mechanism is to be able to arrest the rotation of the inertial member at the position corresponding to the desired phase between the drive and the driven member.

Though one can place a stop in the path of the inertial member 20 at any desired position, the torque that the stop has to withstand with vary with the angular position of the stop. In the dead centre positions when the crank offset lies in line with the reaction force the torque on the stop is at a minimum and it is at a maximum when the crank is at right angles to the reaction force. In the illustrated embodiment of the invention, a latch member 28 is used to stop the inertial member 20 in its two dead centre position giving a bistable operation in which the phase between the drive member 10 and the driven member 14 can be varied switched between two stable values.

The latch member 28 is in the form of a closed frame surrounding the inertial member 20. The latter has a projecting abutment 24 which stops the inertial member 20 when it comes to rest against one of two steps 40 formed on the inner surface of the latch member 28. The latch member 28 is guided for sliding movement between a pair of segment shaped blocks 26, 26' which are fast in rotation with the driven member 14 and its travel is limited by the drive member 10. Centrifugal force acting on the latch member 28 urges it into its end positions and to effect a phase change it is only necessary to drive the latch member 28 past its centre position where its centre of gravity overlies the axis of rotation of the camshaft.

In order to apply an external force for moving the latch member 28 while the entire mechanism is rotating, a stationary electromagnetic coil 38, which is in the form of a ring, is mounted on the engine block. The windings on the coil 38 are such that the field lines are radial so that the coil acts as an annular magnet with one pole on the radially inner surface and the other pole on the radially outer surface, the polarity of the electromagnet being reversible by changing the direction of current flow through the coil.

Figure 3:
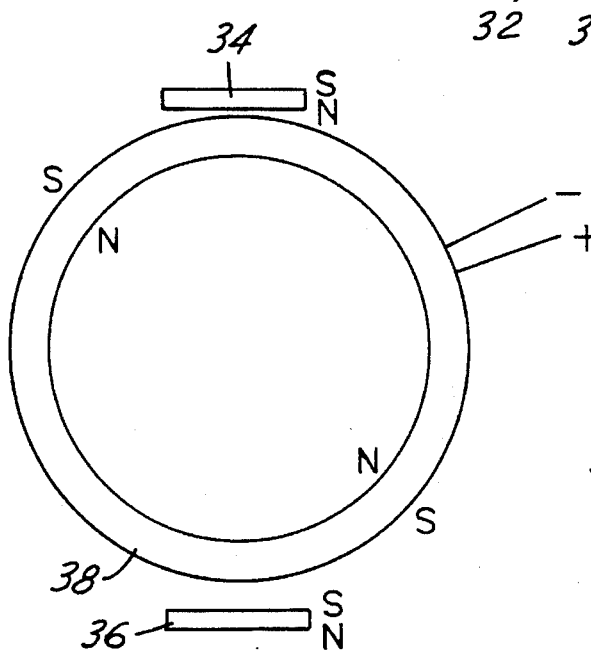
FIG. 3 is a schematic view in the plane 3—3 in FIG. 1 from which some of the components have been omitted in the interest of clarity.

The latch member 38 has a pair of upstanding ears 30 and 32 which carry respective permanent magnets 34 and 36. The polarity of the permanent magnets 34, 36 and their interaction with the coil 38 is best illustrated in the schematic view shown in FIG. 3. If in this figure the polarity of the coil 38 is reversed so that its outer surface becomes a north pole and its inner surface a south pole, regardless of the angular position of the camshaft, the magnet 34 will be repelled and the magnet 36 will be attracted to the coil 38 so that the two magnets 34 and 36 are both subjected to a force tending to move the magnets 34, 36 and with them the latch member 28 up as viewed in FIG. 3.

Figure 2:
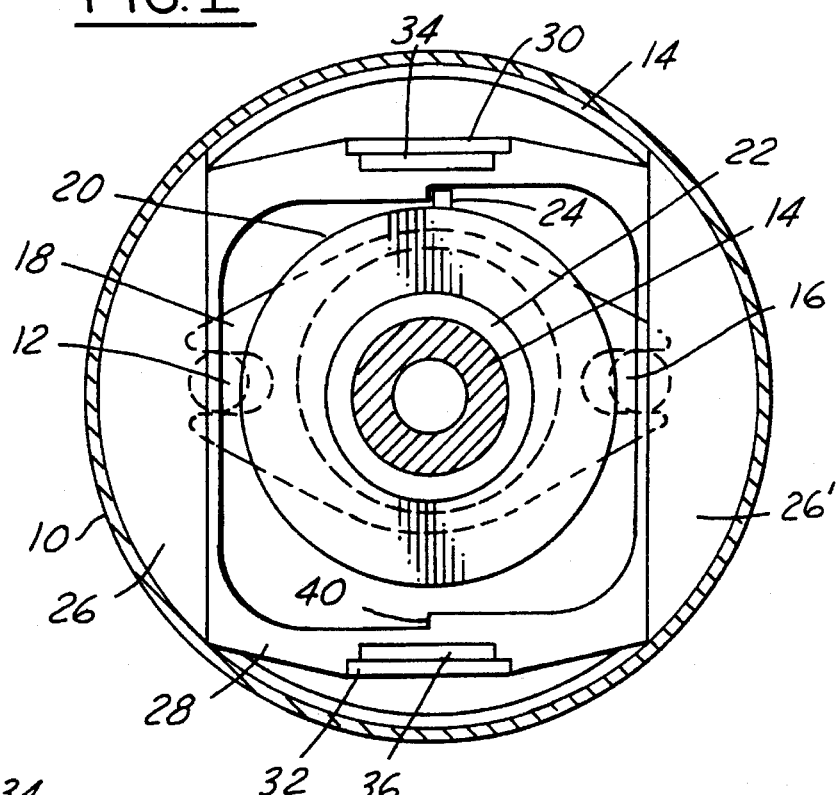
FIG. 2 is a schematic view of the phase change mechanism, in the plane 2—2 in FIG. 1.

When the latch member 28 is moved from the position shown in FIG. 2 into its other end position, it will release the abutment 24 and allow the inertial member to rotate counter clockwise as viewed until it is again arrested by the other step 40 which will now have moved up into an obstructing position. The centrifugal force on the latch member 28 will keep it in its new position and the coil 38 need only be energized to effect the change in phase. Similarly, when the latch member is in its new position, temporarily energizing the coil 38 with reversed polarity will result in the latch member returning to its illustrated position.

It is possible to arrange the steps 40 and the one-way clutch 22 in such a manner as to allow clockwise or counter clockwise rotation of the inertial member 20. It is preferred to select the direction of rotation which will allow the more rapid change of phase during engine acceleration.

I claim:

1. A phase change mechanism for varying the phase of an engine camshaft relative the engine crankshaft, comprising a drive member connected to the camshaft drive, a driven member connected to the camshaft, a coupling element for transmitting torque from the drive member to the driven member and movable relative to the drive and driven members to vary the phase between the drive and driven members, an inertial member coupled by means of a one-way clutch for rotation with the drive and driven members and having an eccentric crank thereon acting n the coupling element to vary the position of the coupling element in dependence of the rotational position of the inertial member, and latching means for arresting rotation of the inertial member at predetermined angular positions, characterized in that the latching means comprise an abutment surface projecting radially from the inertial member, a latch member mounted on one of the drive and driven members for transverse sliding movement relative to the axis of the inertial member between two end positions, a pair of opposed abutment surfaces on the latch member disposed one on each side of the inertial member and each engaging the abutment surface on the inertial member in a respective one of the end positions of the latch member and means for switching the latch member between the end positions while the phase change mechanism is rotating.

2. A phase change mechanism as claimed in claim 1, wherein the latch member comprises a pair of permanent magnets at its opposite ends, which rotate relative to a stationary electromagnet having a magnetic field with radially extending lines of force.

3. A phase change mechanism as claimed in claim 1 wherein the latch member is a continuous ring surrounding the inertial member, the centre of gravity of the latch member lying on opposite sides of the axis of rotation of the phase change mechanism in the end positions of the latch member, whereby the latch member is retained in each of its end positions by centrifugal force.

* * * * *